US012790882B2

(12) United States Patent
Reuber

(10) Patent No.: US 12,790,882 B2
(45) Date of Patent: Nov. 10, 2026

(54) CLOSURE SYSTEM

(71) Applicant: Magna Exteriors GmbH, Sailauf (DE)

(72) Inventor: Stefan Reuber, Birken-Honigsessen (DE)

(73) Assignee: Magna Exteriors GmbH, Sailauf (DE)

(*) Notice: Subject to any disclaimer, the term of this patent is extended or adjusted under 35 U.S.C. 154(b) by 436 days.

(21) Appl. No.: 18/650,839

(22) Filed: Apr. 30, 2024

(65) Prior Publication Data

US 2024/0368934 A1 Nov. 7, 2024

(30) Foreign Application Priority Data

May 3, 2023 (DE) ..................... 10 2023 204 091.3

(51) Int. Cl.

*E05F 17/00* (2006.01)
*E05D 15/40* (2006.01)
*E05F 15/00* (2015.01)

(52) U.S. Cl.

CPC ............ *E05F 17/00* (2013.01); *E05D 15/403* (2013.01); *E05F 15/00* (2013.01); *E05Y 2201/716* (2013.01); *E05Y 2900/53* (2013.01)

(58) Field of Classification Search

CPC ........ B60K 11/085; F01P 7/10; E05D 15/403; E05F 15/00; E05F 15/403; E05F 17/00; E05Y 2900/53; E05Y 2201/716

See application file for complete search history.

(56) References Cited

U.S. PATENT DOCUMENTS

| | | | |
|---|---|---|---|
| 2017/0021720 A1 | 1/2017 | Anderson et al. | |
| 2019/0023119 A1 | 1/2019 | Klop et al. | |

FOREIGN PATENT DOCUMENTS

| | | | |
|---|---|---|---|
| CN | 113043838 A | 6/2021 | |
| DE | 102014226028 A1 * | 6/2016 | ........... B60K 11/085 |
| DE | 102015221003 A1 * | 4/2017 | ........... B60K 11/085 |
| DE | 102017107240 A1 | 4/2018 | |
| DE | 202022101234 U1 | 4/2022 | |
| EP | 4147897 A1 | 3/2023 | |

* cited by examiner

*Primary Examiner* — Allen R. B. Schult
(74) *Attorney, Agent, or Firm* — Dickinson Wright PLLC

(57) ABSTRACT

A closure system in a vehicle for opening and closing openings for an air passage includes at least two closure elements fitted to a closure carrier. The at least two closure elements close or release the same number of openings and are moved together. The closure carrier is supported on bearings on the vehicle at the respective end regions of the longitudinal extent of the closure carrier, and is pivoted by way of a single actuator with a gear mechanism and a lever drive about articulation locations on the vehicle. The lever drive drives additional levers in the end region of the closure carrier which is spaced apart from the actuator by way of a square shaft.

14 Claims, 3 Drawing Sheets

CLOSURE SYSTEM

FIELD

The present disclosure relates to a closure system in a vehicle for opening and closing openings for an air passage, wherein at least two closure elements close or release the same number of openings, wherein the closure elements can be moved together.

BACKGROUND

Closure elements, for example, in the form of air flaps, are used for a large number of applications for the selective fluid supply in a vehicle in order to ensure the control of air, for example, for the air supply of the interior/for air conditioning the interior of the vehicle and cooling the motor or other drive elements. In order to transmit the forces provided by one or more drive elements to move and position the closure elements, gear mechanisms are generally necessary and are known in extremely varied forms and embodiments. In most cases, a closure system with a gear mechanism for transmitting movement from a drive to a closure system is used. As long as this closure system comprises two or more closure elements, the problem occurs that the application of force for moving the closure elements is made more difficult by an individual drive. Consequently, a more powerful drive or a plurality of drives have to be used, which involves higher costs and more structural complexity.

DE 10 2017 107 240 A1 discloses a closure system for selectively opening and closing a fluid passage which comprises at least one rotatable actuator and at least a first output element and a second output element, wherein the actuator and the output elements in each case have at least one curved circumferential portion, wherein a circumferential portion is an engagement portion, characterized in that the engagement portion of the actuator is suitable for being in engagement with the engagement portion of the first and/or second output element and wherein the rotational movement of the actuator brings about a time-staggered/delayed engagement between the engagement portion of the actuator with the engagement portion of the first output element and between the engagement portion of the actuator with the engagement portion of the second output element.

DE 10 2015 221 003 A1 discloses an air supply adjustment apparatus for a motor vehicle having a plurality of air passage openings, behind which an air passage channel extends, and a flap which is pivotably supported on a carrier structure by way of at least one lever arm which is rigidly connected to the flap. The flap can be pivoted about precisely one actual or virtual rotation axis between a closed position, in which an air passage through the air passage openings is at a minimum, and an open position, in which an air passage through the air passage openings is at a maximum. One pivotable flap closes the plurality of air passage openings in the closed position. The rotation axis is configured with spacing from the air passage openings and consequently from a closure face of the flap for the air passage openings. Consequently, the flap is rotatably supported by way of a single joint.

DE 20 2022 101 234 U1 discloses a closure flap system for a motor vehicle having an opening in a contour portion of a vehicle outer skin or a vehicle interior, and having a closure flap which is supported in a pivotably movable manner in the region of the opening for closing or releasing the opening. There is a control unit which is actively connected to the closure flap in order to move the closure flap between a release position and a closed position, wherein the control unit has an activation wire which can be changed in terms of length by way of electrical activation and which is coupled to a control member which can be moved in two opposing directions and which is provided for mechanical control of the closure flap.

An object of the present disclosure is to provide a closure system for selectively opening and closing a fluid passage which enables a force-saving movement and locking of a plurality of different closure elements by way of a single drive.

SUMMARY

The object is achieved with a closure system having at least two closure elements that close or release a number of openings corresponding in quantity to the closure elements, wherein the at least two closure elements can be moved together, wherein the closure elements are fitted to a closure carrier, which is supported at respective end regions of the longitudinal extent thereof on bearings on the vehicle, and which can be pivoted by way of a single actuator with a gear mechanism and a lever drive about articulation locations on the vehicle, wherein the lever drive drives additional levers by way of a square shaft in the end region of the closure carrier that is spaced apart from the actuator.

The object is specifically achieved with a closure system in a vehicle for opening and closing openings of an air passage, wherein at least two closure elements close or release a number of openings corresponding in quantity to the closure elements, wherein the closure elements can be moved together, wherein the closure elements are fitted to a closure carrier that is supported at respective end regions of the longitudinal extent thereof on bearing locations on the vehicle, and which can be pivoted by way of a single actuator with a gear mechanism and a lever drive about articulation locations on the vehicle, and wherein the lever drive drives additional levers by way of a square shaft in the end region of the closure carrier that is spaced apart from the actuator.

By using a closure carrier that is securely supported at the end, the individual closure elements are moved without tilting.

DETAILED DESCRIPTION

Figure 1:
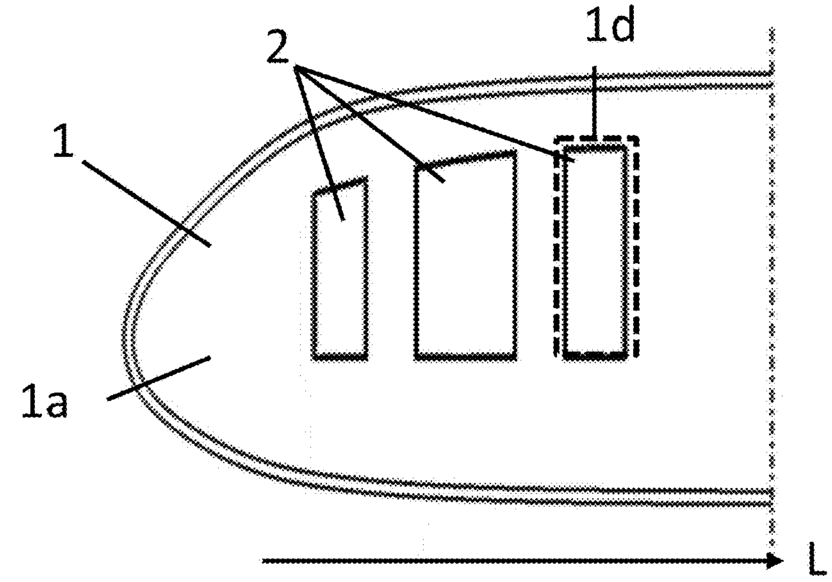
FIG. 1 shows a front cover with a plurality of closure elements from the outer side.

FIG. 1 shows a front cover 1 as used in many vehicles in the region of the front trim. The front cover 1 of FIG. 1 is illustrated as a plan view which allows a view of the outer face 1*a* of the front cover 1. Illustrated by way of example are closure elements 2 which are fitted along the horizontal extent of the front cover 1. These closure elements 2 close openings 1*d* in the front cover 1 in the closed state and can be removed in order to produce an air flow from the openings 1*d*.

Figure 2:
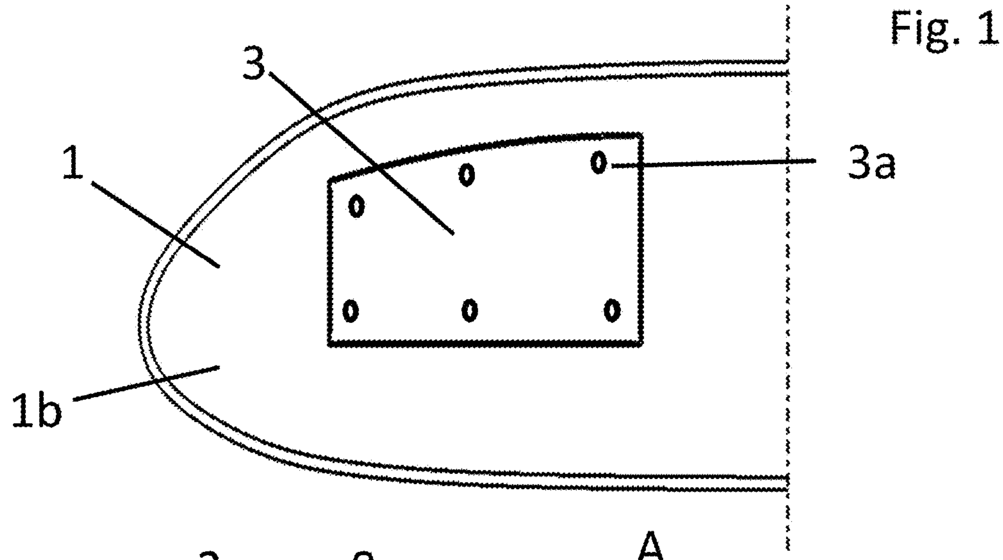
FIG. 2 shows the front cover from the inner side without a drive.

FIG. 2 shows the front cover 1 in a view of the inner face 1*b*. The closure elements 2 cannot be seen in this view because a closure carrier 3 which carries the closure elements 2 at the securing locations 3*a* thereof is illustrated. The closure carrier 3 connects the individual closure elements 2 so that in the case of a movement of the closure carrier 3 the closure elements 2 are moved together.

Figure 3:
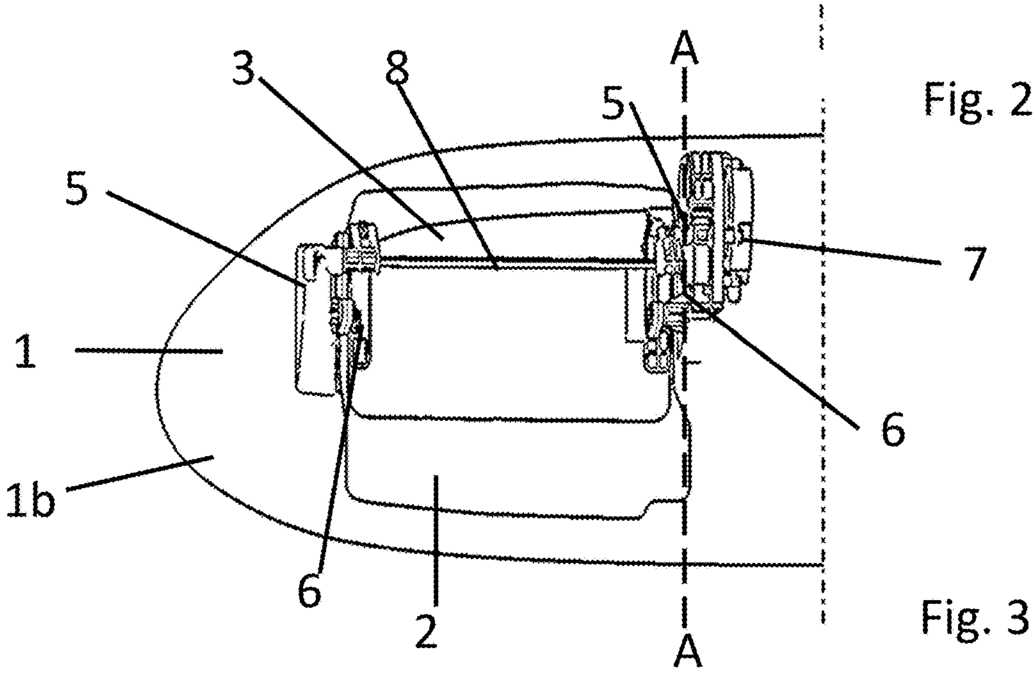
FIG. 3 shows the front cover from the inner side with a drive.

In FIG. 3, the inner view of the inner face 1*b* of the front cover 1 is illustrated with structural elements that are used for the movement of the closure elements 2 on the closure carrier 3. In this exemplary embodiment, the closure elements 2 are illustrated as faces which are fitted to the closure carrier 3. Via bearings 5, there is supported a shaft 8 that is driven by way of a lever drive 6 and an actuator 7 at one side. The shaft 8 is a square shaft. A lateral connection 3*b* of the closure carrier 3 that is used for connection to the bearings 5 is not illustrated in FIG. 3.

Figure 4:
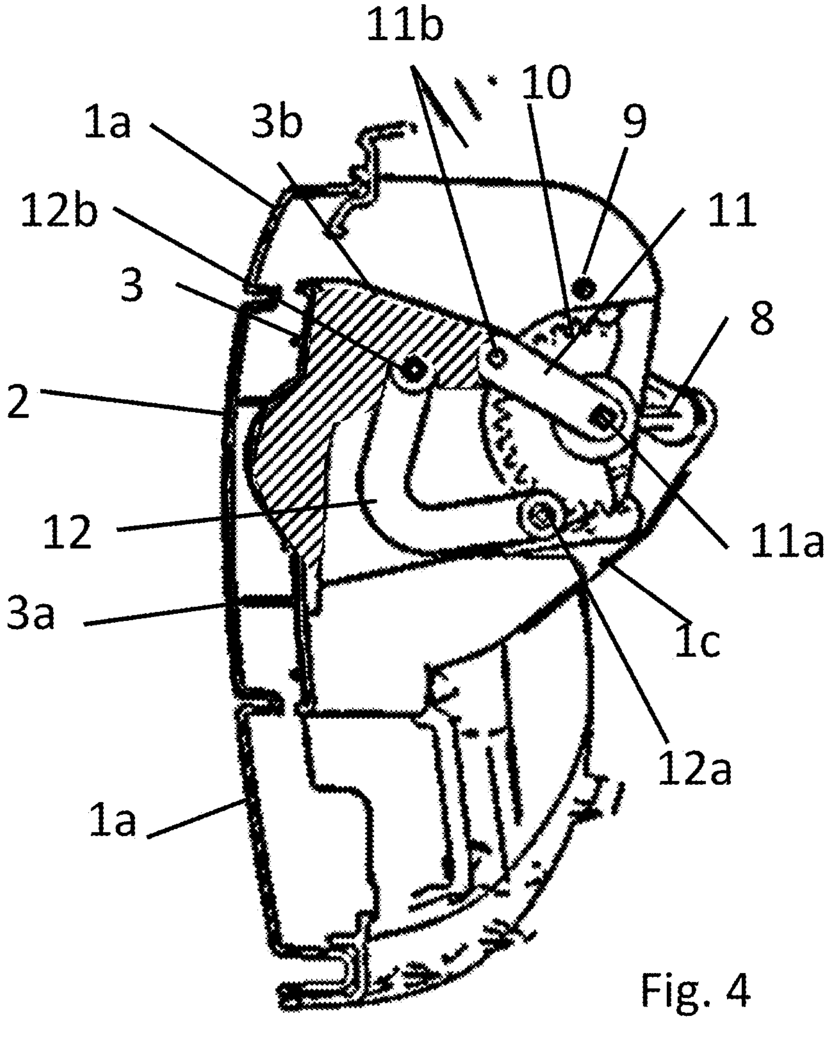
FIG. 4 shows a section along A-A of FIG. 3 with closed closure elements.

FIG. 4 is a sectioned illustration along line A-A of FIG. 3. FIG. 4 shows the closure elements 2 in a closed state. The closure elements 2 are visibly inserted in this section through a small gap in the front cover 1. The closure elements 2 are connected at the securing locations 3*a* to the closure carrier 3, which in this embodiment does not extend in a planar manner, but instead with an indentation. At the respective bearing side, there are arranged lateral connections 3*b* which extend in the manner of a wing into the vehicle interior. The lateral connections 3*b* have two articulation locations 12*b* and 11*b*.

At the articulation location 11*b* a first lever 11*b* is fitted, and at the articulation location 12*b* a second lever 12 is fitted. An additional articulation location 11*a* of the first lever 11 is positioned on the shaft 8 of the closure system. There is also positioned on the shaft 8 a star wheel 10 that extends substantially along a semi-circle. In the star wheel 10 there engages a pinion which is not illustrated and which is driven by the actuator 7. With the rotation of the star wheel 10, the lever 11 is rotated and the lateral connection 3*b* is pivoted by way of the second lever 12. In this instance, the second lever 12 rotates about the articulation location 12*a* which is fitted in a side wall 1*c* of the front cover 1. This side wall 1*c* of the front cover 1 extends in the region of the bearing into the vehicle interior.

Figure 5:
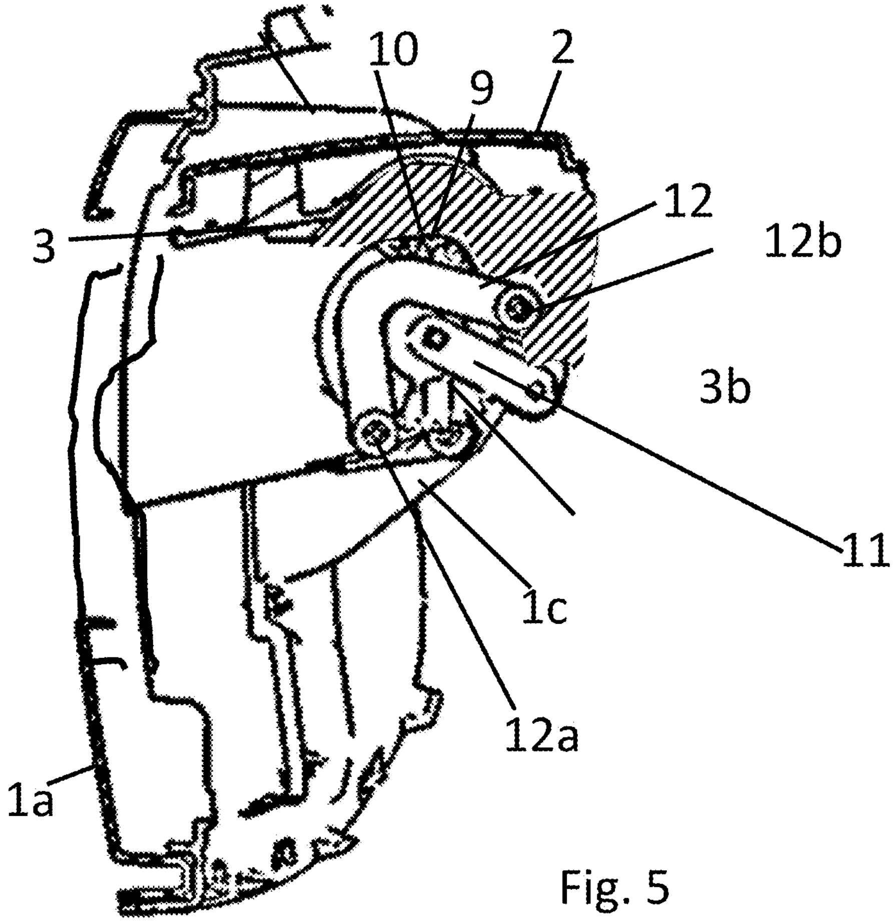
FIG. 5 shows a section along A-A of FIG. 3 with open closure elements.

FIG. 5 illustrates the situation after the closure element 2 is completely opened. The closure element 2 with the closure carrier 3 and the lateral connection 3*b* is now inside the vehicle and releases the opening in the front cover 1.

LIST OF REFERENCE NUMERALS

1 Front cover
1*a* Outer face of the front cover
1*b* Inner face of the front cover
1*c* Side wall
1*d* Opening
2 Closure elements
3 Closure carrier
3*a* Securing locations
3*b* Lateral connection
4 Drive unit
5 Bearing
6 Lever drive
7 Actuator
8 Shaft
9 Drive gear
10 Star wheel
11 First lever
11*a*, 11*b* Articulation locations
12 Second lever
12*a*, 12*b* Articulation locations

The invention claimed is:

1. A closure system in a vehicle for opening and closing openings of an air passage, the closure system comprising:
at least two closure elements, wherein the at least two closure elements close or release a quantity of openings corresponding to the at least two closure elements, wherein the at least two closure elements move together,
a closure carrier supported on bearings of the vehicle at respective end regions of a longitudinal extent of the closure carrier,
wherein the at least two closure elements are fitted to the closure carrier,
where the closure carrier is pivoted about articulation locations on the vehicle by way of a single actuator with a gear mechanism and a lever drive,
wherein, by way of a square shaft, the lever drive drives first and second levers in the end region of the closure carrier that is spaced apart from the actuator.

2. The closure system of claim 1, wherein the articulation locations for pivoting the closure carrier are fitted to side walls of a front cover of the vehicle.

3. The closure system of claim 2, wherein the front cover defines the openings that are closed and released by the at least two closure elements.

4. The closure system of claim 1, wherein the closure carrier is attached to the first and second levers via at least one lateral connection.

5. The closure system of claim 4, wherein the at least one lateral connection is attached to the first and second levers via first and second articulation locations.

6. The closure system of claim 5, wherein the first lever is attached to the shaft at a third articulation location, and the second lever is attached to the vehicle at a fourth articulation location.

7. The closure system of claim 6, wherein pivoting of the shaft pivots the first lever about the third articulation location, which moves the at least one lateral connection via the first articulation location, and the second lever pivots about the second and fourth articulation locations in response to movement of the at least one lateral connection.

8. The closure system of claim 6, wherein the second lever has a bent shape and the first lever is straight.

9. The closure system of claim 8, wherein in a closed state of the closure carrier the first lever is outside of an outer envelope of the second lever, and the in an open state of the closure carrier and end portion of the first lever including the third articulation location is dispose within the outer envelope of the second lever.

10. The closure system of claim 6, wherein the first and second articulation locations are moveable and the third and fourth articulation locations remain stationary during movement of the closure carrier.

11. The closure system of claim 5, wherein each of the at least one lateral connection is in the form of a wing.

12. The closure system of claim 11, wherein the at least one lateral connection is received in an indentation of the closure carrier.

13. The closure system of claim 1, wherein the at least two closure elements are each attached to the closure carrier at a plurality of separate securing locations.

14. The closure system of claim 1, wherein the lever drive is driven by way of a pinion that is driven by the actuator and that engages in a star wheel coupled to the square shaft.

* * * * *